(12) United States Patent
Matsumoto

(10) Patent No.: US 11,108,978 B2
(45) Date of Patent: Aug. 31, 2021

(54) IMAGE SENSOR AND IMAGE-CAPTURING DEVICE INCLUDING ADJUSTMENT UNIT FOR REDUCING CAPACITANCE

(71) Applicant: NIKON CORPORATION, Tokyo (JP)

(72) Inventor: Shigeru Matsumoto, Sagamihara (JP)

(73) Assignee: NIKON CORPORATION, Tokyo (JP)

(*) Notice: Subject to any disclaimer, the term of this patent is extended or adjusted under 35 U.S.C. 154(b) by 0 days.

(21) Appl. No.: 16/475,261

(22) PCT Filed: Jan. 31, 2018

(86) PCT No.: PCT/JP2018/003278
§ 371 (c)(1),
(2) Date: Oct. 4, 2019

(87) PCT Pub. No.: WO2018/143295
PCT Pub. Date: Aug. 9, 2018

(65) Prior Publication Data
US 2020/0036916 A1  Jan. 30, 2020

(30) Foreign Application Priority Data

Jan. 31, 2017  (JP) .............. JP2017-016286

(51) Int. Cl.
*H04N 5/335*  (2011.01)
*H04N 5/347*  (2011.01)
*H04N 5/378*  (2011.01)

(52) U.S. Cl.
CPC ............ *H04N 5/347* (2013.01); *H04N 5/378* (2013.01)

(58) Field of Classification Search
CPC .................. H04N 5/347; H04N 5/378
(Continued)

(56) References Cited

U.S. PATENT DOCUMENTS 6,452,153 B1  9/2002 Lauxtermann et al.
2015/0296155 A1  10/2015 Tanaka
(Continued)

FOREIGN PATENT DOCUMENTS

JP  2015-204469 A  11/2015
JP  2015-211257 A  11/2015
(Continued)

OTHER PUBLICATIONS

Apr. 17, 2018 International Search Report issued in International Patent Application No. PCT/JP2018/003278.
(Continued)

*Primary Examiner* — Usman A Khan
(74) *Attorney, Agent, or Firm* — Oliff PLC

(57) ABSTRACT

An image sensor includes: a first pixel having a first photoelectric conversion unit that photoelectrically converts light to generate a charge, a first accumulation unit that accumulates the charge generated by the first photoelectric conversion unit, and a first output unit that is connected to the first accumulation unit; a second pixel having a second photoelectric conversion unit that photoelectrically converts light to generate a charge, a second accumulation unit that accumulates the charge generated by the second photoelectric conversion unit, and a second output unit that is connected to and disconnected from the second accumulation unit via a second connection unit; and an adjustment unit that adjusts capacitances of the first accumulation unit and the second accumulation unit if a signal based on the charges generated by the first photoelectric conversion unit and the second photoelectric conversion unit is output from the first output unit.

15 Claims, 10 Drawing Sheets

(58) Field of Classification Search
USPC .......................................................... 348/300
See application file for complete search history.

(56) References Cited

U.S. PATENT DOCUMENTS

| | | | |
|---|---|---|---|
| 2015/0312491 A1 | 10/2015 | Egawa | |
| 2016/0219237 A1* | 7/2016 | Kobayashi | ........... H04N 5/3745 |
| 2016/0373668 A1 | 12/2016 | Komai et al. | |

FOREIGN PATENT DOCUMENTS

| | | |
|---|---|---|
| JP | 2016-015680 A | 1/2016 |
| JP | 2016-139859 A | 8/2016 |

OTHER PUBLICATIONS

Aug. 18, 2020 Office Action issued in Japanese Patent Application No. 2018-565620.

Dec. 31, 2020 Office Action issued in Chinese Patent Application No. 201880009220.7.

* cited by examiner

IMAGE SENSOR AND IMAGE-CAPTURING DEVICE INCLUDING ADJUSTMENT UNIT FOR REDUCING CAPACITANCE

TECHNICAL FIELD

The present invention relates to an image sensor and an image-capturing device.

BACKGROUND ART

PTL1 discloses an image-capturing device that adds (mixes) charges of two light receiving elements and reads out a potential corresponding to the added charge. However, the conventional image-capturing device has a problem that a conversion gain in converting the added charge into the potential is low.

CITATION LIST

Patent Literature

PTL1: Japanese Laid-Open Patent Publication No. 2016-139859

SUMMARY OF INVENTION

An image sensor according to the 1st aspect of the present invention comprises: a first pixel having a first photoelectric conversion unit that photoelectrically converts light to generate a charge, a first accumulation unit that accumulates the charge generated by the first photoelectric conversion unit, and a first output unit that is connected to the first accumulation unit; a second pixel having a second photoelectric conversion unit that photoelectrically converts light to generate a charge, a second accumulation unit that accumulates the charge generated by the second photoelectric conversion unit, and a second output unit that is connected to and disconnected from the second accumulation unit via a second connection unit; and an adjustment unit that adjusts capacitances of the first accumulation unit and the second accumulation unit if a signal based on the charges generated by the first photoelectric conversion unit and the second photoelectric conversion unit is output from the first output unit.

An image sensor according to the 2nd aspect of the present invention comprises: a first pixel having a first photoelectric conversion unit that photoelectrically converts light to generate a charge, a first accumulation unit that accumulates the charge generated by the first photoelectric conversion unit, and a first output unit that is connected to the first accumulation unit via a first connection unit; and a second pixel having a second photoelectric conversion unit that photoelectrically converts light to generate a charge, a second accumulation unit that accumulates the charge generated by the second photoelectric conversion unit, and a second output unit that is connected to and disconnected from the second accumulation unit via a second connection unit.

An image-capturing device according to the 3rd aspect of the present invention comprises: the image sensor according to the 1st aspect or the 2nd aspect; and an image generation unit that generates image data based on a signal output from the image sensor.

DESCRIPTION OF EMBODIMENTS

First Embodiment

Figure 1:
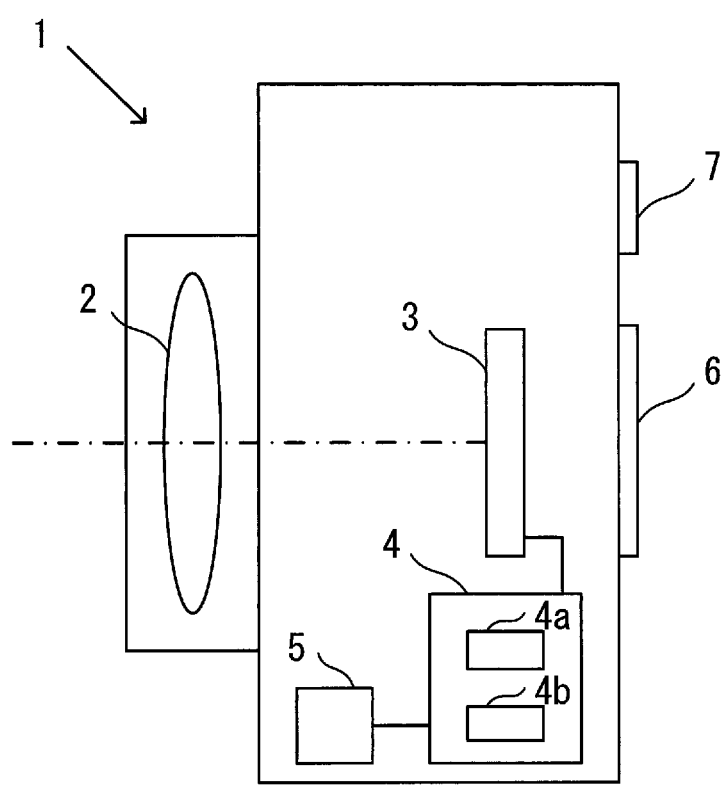
FIG. 1 is a block diagram showing a configuration of an image-capturing device according to a first embodiment.

FIG. 1 is a block diagram showing a configuration of an image-capturing device according to a first embodiment. FIG. 1 shows an example of a configuration of an electronic camera 1 (hereinafter referred to as a camera 1), which is an example of an image-capturing device according to the first embodiment. The camera 1 includes an image-capturing optical system (image-forming optical system) 2, an image sensor 3, a control unit 4, a memory 5, a display unit 6, and an operation unit 7. The image-capturing optical system 2 has a plurality of lenses, including a focus adjustment lens (focus lens), and a diaphragm and forms a subject image on the image sensor 3. Note that the image-capturing optical system 2 may be detachable from the camera 1.

The image sensor 3 is, for example, a CMOS image sensor. The image sensor 3 receives light flux having passed through an exit pupil of the image-capturing optical system 2 and captures a subject image. As will be described later in detail, the image sensor 3 has a plurality of pixels arranged two-dimensionally (in a row direction and in a column direction intersecting the row direction). Each pixel has a microlens and a plurality of photoelectric conversion units (for example, two photoelectric conversion units). The photoelectric conversion unit includes, for example, a photodiode (PD). The image sensor 3 photoelectrically converts incident light to generate a signal, and outputs the generated signal to the control unit 4.

As will be described later in detail, the image sensor 3 outputs a signal for generating image data (i.e., an image-capturing signal) and a pair of focus detection signals for performing phase difference type focus detection for the focus of the image-capturing optical system 2 (i.e., first and second focus detection signals) to the control unit 4. The first and second focus detection signals are, respectively, signals obtained by photoelectrically converting first and second images based on first and second light fluxes passing through first and second regions of the exit pupil of the image-capturing optical system 2.

The memory 5 is, for example, a recording medium such as a memory card. The memory 5 records image data and the like. Data writing to the memory 5 and data reading from the memory 5 are performed by the control unit 4. The display unit 6 displays an image based on image data, information on photographing such as a shutter speed and an aperture value, and a menu screen. The operation unit 7 includes various setting switches such as a release button and a power switch, and outputs an operation signal corresponding to each operation to the control unit 4.

The control unit 4 includes a CPU, a ROM, a RAM, and the like, and controls each unit of the camera 1 based on a control program. The control unit 4 includes an image data generation unit 4a and a focus detection unit 4b. The image data generation unit 4a performs various types of image processing on the image-capturing signal output from the image sensor 3 to generate image data. The image processing includes, for example, known image processing such as tone conversion processing, color interpolation processing, and edge enhancement processing.

The focus detection unit 4b performs a focus detection process necessary for automatic focus adjustment (AF) of the image-capturing optical system 2 by a known phase difference detection scheme. Specifically, the focus detection unit 4b detects an image shift amount between the first and second images based on a pair of focus detection signals output from the image sensor 3, and calculates a defocus amount based on the detected image shift amount. The focus adjustment is automatically performed by driving the focus adjustment lens in accordance with the defocus amount.

The control unit 4 preforms a process of individually reading out signals from the plurality of photoelectric conversion units of each pixel of the image sensor 3 (a first control mode) and a process of adding and reading out signals from the plurality of photoelectric conversion units (a second control mode). In this embodiment, in the first control mode, a signal based on a charge generated by the first photoelectric conversion unit and a signal based on a charge generated by the second photoelectric conversion unit are individually (i.e., independently) read out as a pair of focus detection signals, as will be described later in detail.

In the second control mode, the control unit 4 performs a process of adding the signals from the first and second photoelectric conversion units to read out the processed signal as an image-capturing signal. Here, the "process of adding" includes a process of averaging a plurality of signals, a process of weighting and adding a plurality of signals, and the like. The control unit 4 performs the first control mode in a case of performing a phase difference AF to read out a pair of focus detection signals from the image sensor 3, and performs the second control mode in a case of generating image data to read out an image-capturing signal from the image sensor 3.

Figure 2:
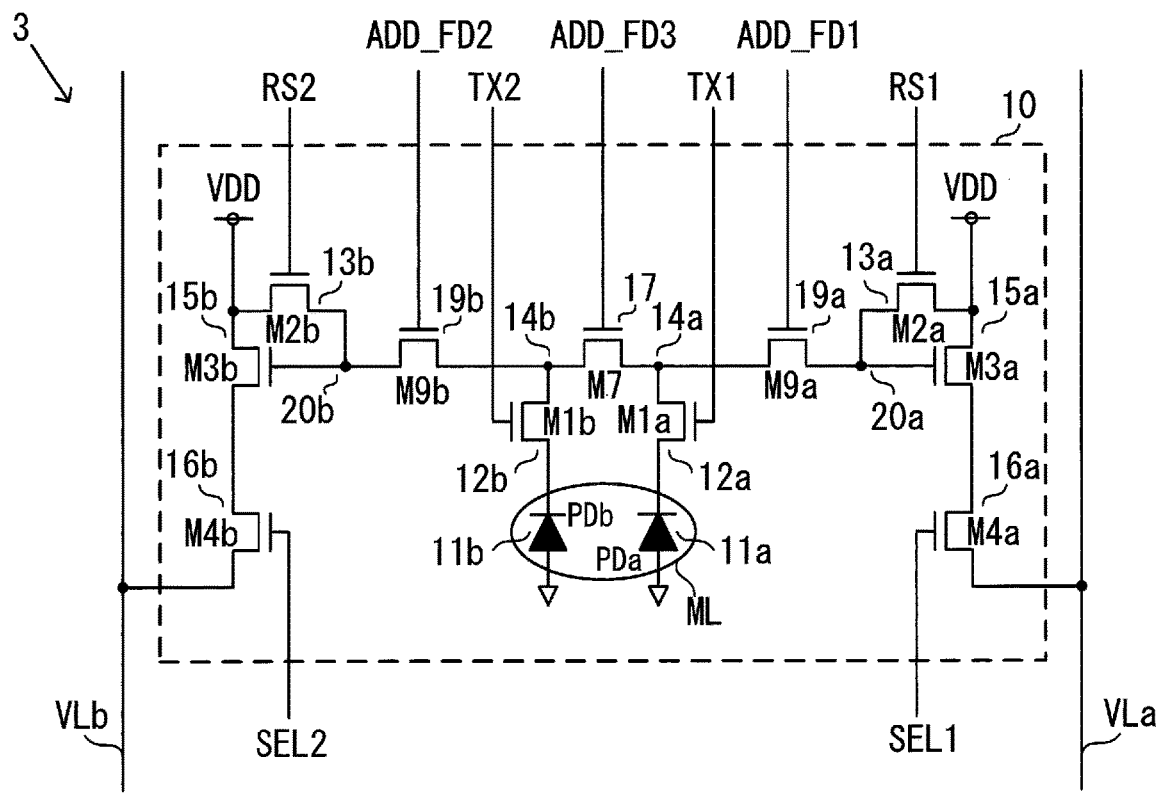
FIG. 2 is a circuit diagram showing a configuration of a pixel according to the first embodiment.

FIG. 2 is a circuit diagram showing a configuration of a pixel of the image sensor 3 according to the first embodiment. The pixel 10 includes a microlens ML, a first photoelectric conversion unit 11a, a second photoelectric conversion unit 11b, a first transfer unit 12a, a second transfer unit 12b, and a first reset unit 13a, a second reset unit 13b, a first accumulation unit 14a, and a second accumulation unit 14b. The pixel 10 further includes a first amplification unit 15a, a second amplification unit 15b, a first selection unit 16a, a second selection unit 16b, an addition switch unit 17, a first connection switch unit 19a, a second connection switch unit 19b, a first region 20a, and a second region 20b.

The microlens ML focuses light, which is incident through the image-capturing optical system 2 in FIG. 1, on the first photoelectric conversion unit 11a and the second photoelectric conversion unit 11b. Note that the microlens ML is denoted by an oval-shaped line that surrounds the first and second photoelectric conversion units 11a, 11b to indicate that a light flux having passed through the microlens ML is incident on the first and second photoelectric conversion units 11a, 11b. The oval shape does not denote the actual size or actual shape of the microlens ML.

The first photoelectric conversion unit 11a and the second photoelectric conversion unit 11b are photodiodes PD (PDa, PDb), which have a function of converting incident light into charges and accumulating the charges obtained through photoelectric conversion. The first photoelectric conversion unit 11a and the second photoelectric conversion unit 11b are arranged so as to correspond to one microlens ML, and receive light fluxes that have passed through mutually different regions of the exit pupil of the image-capturing optical system 2. That is, the first photoelectric conversion unit 11a and the second photoelectric conversion unit 11b, respectively, photoelectrically convert first and second images based on first and second light fluxes passing through first and second regions of the exit pupil of the image-capturing optical system 2.

The first transfer unit 12a includes a transistor M1a, which is controlled by a signal TX1. When a transistor M9a of the first connection switch unit 19a is off, the first transfer unit 12a transfers a charge obtained through photoelectric conversion by the first photoelectric conversion unit 11a to the first accumulation unit 14a. That is, the first transfer unit 12a forms a charge transfer path between the first photoelectric conversion unit 11a and the first accumulation unit 14a. On the other hand, when the transistor M9a of the first connection switch unit 19a is on, the first transfer unit 12a transfers the charge obtained through photoelectric conversion by the first photoelectric conversion unit 11a to the first accumulation unit 14a and the first region 20a. The transistor M1a is a first transfer transistor. Capacitances such as a capacitance (parasitic capacitance) of each transistor connected to the first accumulation unit 14a and a wiring capacitance are added to the first accumulation unit 14a. The first accumulation unit 14a accumulates (holds) the charge transferred to the first accumulation unit 14a, and converts the charge into a voltage divided by a capacitance value.

The first connection switch unit 19a includes a transistor M9a, which is controlled by a signal ADD_FD1, and connects (couples) the first accumulation unit 14a to the first amplification unit 15a. It can also be said that the first connection switch unit 19a connects the first accumulation unit 14a to the first region 20a. Capacitances such as a capacitance of each transistor (e.g., a gate capacitance of the first amplification unit 15a connected to the first region 20a) and a wiring capacitance are added to the first region 20a. The first region 20a accumulates the charge transferred to the first region 20a, and converts the charge into a voltage divided by a capacitance value.

The first amplification unit 15a amplifies and outputs a signal based on the charge transferred from the photoelectric conversion unit. The first amplification unit 15a includes a transistor M3a. A drain (terminal) of the transistor M3a is connected to a power supply VDD, and a gate (terminal) of the transistor M3a is connected to a drain of the transistor M9a of the first connection switch unit 19a. A source (terminal) of the transistor M3a is connected to a transistor M4a of the first selection unit 16a. The source of the transistor M3a of the first amplification unit 15a is connected to a first vertical signal line VLa via the first selection unit 16a. The first amplification unit 15a functions as a part of a source follower circuit, with a first current source 25a shown in FIG. 3 as a load current source. The transistor M3a is a first amplification transistor.

The first reset unit 13a includes a transistor M2a, which is controlled by a signal RS1, and resets charges of the first region 20a and the first accumulation unit 14a and resets voltages of the first region 20a and the first accumulation unit 14a. The transistor M2a is a first reset transistor. The first selection unit 16a includes a transistor M4a, which is controlled by a signal SEL1, and outputs the signal from the first amplification unit 15a to the first vertical signal line VLa. The transistor M4a is a first selection transistor. The first output unit according to the present embodiment includes the first amplification unit 15a, the first selection unit 16a, and the first reset unit 13a, and generates and outputs a signal based on the charge generated by the first photoelectric conversion unit 11a.

The second transfer unit 12b includes a transistor M1b, which is controlled by a signal TX2. When a transistor M9b of the second connection switch unit 19b is off, the second transfer unit 12b transfers a charge obtained through photoelectric conversion by the second photoelectric conversion unit 11b to the second accumulation unit 14b. That is, the second transfer unit 12b forms a charge transfer path between the second photoelectric conversion unit 11b and the second accumulation unit 14b. On the other hand, when the transistor M9b of the second connection switch unit 19b is on, the second transfer unit 12b transfers the charge obtained through photoelectric conversion by the second photoelectric conversion unit 11b to the second accumulation unit 14b and the second region 20b. The transistor M1b is a second transfer transistor. Capacitances such as a capacitance of each transistor connected to the second accumulation unit 14b and a wiring capacitance are added to the second accumulation unit 14b. The second accumulation unit 14b accumulates (holds) the charge transferred to the second accumulation unit 14b, and converts the charge into a voltage divided by a capacitance value.

The second connection switch unit 19b includes a transistor M9b, which is controlled by a signal ADD_FD2, and connects (couples) the second accumulation unit 14b to the second amplification unit 15b. It can also be said that the second connection switch unit 19b connects the second accumulation unit 14b to the second region 20b. Capacitances such as a capacitance of each transistor (e.g., a gate capacitance of the second amplification unit 15b connected to the second region 20b) and a wiring capacitance are added to the second region 20b. The second region 20b accumulates the charge transferred to the second region 20b, and converts the charge into a voltage divided by a capacitance value.

The second amplification unit 15b amplifies and outputs a signal based on the charge transferred from the photoelectric conversion unit. The second amplification unit 15b includes a transistor M3b. A drain of the transistor M3b is connected to a power supply VDD, and a gate of the transistor M3b is connected to a drain of the transistor M9b of the second connection switch unit 19b. A source of the transistor M3b is connected to a transistor M4b of the second selection unit 16b. The source of the second amplification unit 15b is connected to a second vertical signal line VLb via the second selection unit 16b. The second amplification unit 15b functions as a part of a source follower circuit, with a second current source 25b shown in FIG. 3 as a load current source. The transistor M3b is a second amplification transistor.

The second reset unit 13b includes a transistor M2b, which is controlled by a signal RS2, and resets charges of the second region 20b and the second accumulation unit 14b and resets voltages of the second region 20b and the second accumulation unit 14b. The transistor M2b is a second reset transistor. The second selection unit 16b includes a transistor M4b, which is controlled by a signal SEL2, and outputs the signal from the second amplification unit 15b to the second vertical signal line VLb. The transistor M4b is a second selection transistor. The second output unit according to the present embodiment includes the second amplification unit 15b, the second selection unit 16b, and the second reset unit 13b, and generates and outputs a signal based on the charge generated by the second photoelectric conversion unit 11b.

The addition switch unit 17 includes a transistor M7, which is controlled by a signal ADD_FD3, and connects the first accumulation unit 14a to the second accumulation unit 14b. It can also be said that the addition switch unit 17 connects the first transfer unit 12a to the second transfer unit 12b.

In the first control mode, the control unit 4 controls the image sensor 3 so that the transistor M7 of the addition switch unit 17 is off (in an off state), the transistor M9a of the first connection switch unit 19a is on, and the transistor M9b of the second connection switch unit 19b is on. The charge obtained through photoelectric conversion by the first photoelectric conversion unit 11a is transferred to the first accumulation unit 14a and the first region 20a. Then, a signal (first pixel signal) according to the charge transferred from the first photoelectric conversion unit 11a is read out to a first vertical signal line VLa by the first amplification unit 15a and the first selection unit 16a. Further, the charge obtained through photoelectric conversion by the second photoelectric conversion unit 11b is transferred to the second accumulation unit 14b and the second region 20b. A signal (second pixel signal) according to the charge transferred from the second photoelectric conversion unit 11b is read out to a second vertical signal line VLb by the second amplification unit 15b and the second selection unit 16b.

Thus, in the first control mode, the first pixel signal generated in accordance with the charge from the first photoelectric conversion unit 11a is output to the first vertical signal line VLa, and the second pixel signal generated in accordance with the charge from the second photoelectric conversion unit 11b is output to the second vertical signal line VLb. The first pixel signal and the second pixel signal are output to the control unit 4 as a pair of focus detection signals after being subjected to signal processing by a column circuit or the like described later.

Next, a basic operation of the second control mode will be described. In the second control mode, the control unit 4 sets the transistor M7 of the addition switch unit 17 to be on. For example, the control unit 4 sets the transistor M9a of the first connection switch unit 19a to be on, the transistor M9b of the second connection switch unit 19b to be off, the transistor M4a of the first selection unit 16a to be on, and the transistor M4b of the second selection unit 16b to be off. The charges obtained through photoelectric conversion by the first and second photoelectric conversion units 11a, 11b, respectively, are transferred by the first and second transfer units 12a, 12b and added by the addition switch unit 17. An addition pixel signal is generated by the first amplification unit 15a and the first selection unit 16a in accordance with the added charge, and the addition pixel signal is read out to the first vertical signal line VLa. Note that when the transistor M9a of the first selection unit 19a is off, the transistor M9b of the second selection unit 19b is on, the transistor M4a of the first connection switch unit 16a is off, and the transistor M4b of the second connection switch unit 16b is on, the addition pixel signals are read out to the second vertical signal line VLb.

In the present embodiment, the second control mode involves a one-row reading scheme for reading out a signal for each one row of the pixels 10 arranged two-dimensionally, and a two-row simultaneous reading scheme for reading out signals for two rows simultaneously. Hereinafter, the "one-row reading scheme" of the second control mode will be described with reference to FIG. 3, and the "two-row simultaneous reading scheme" of the second control mode will be described with reference to FIG. 4.

Figure 3:
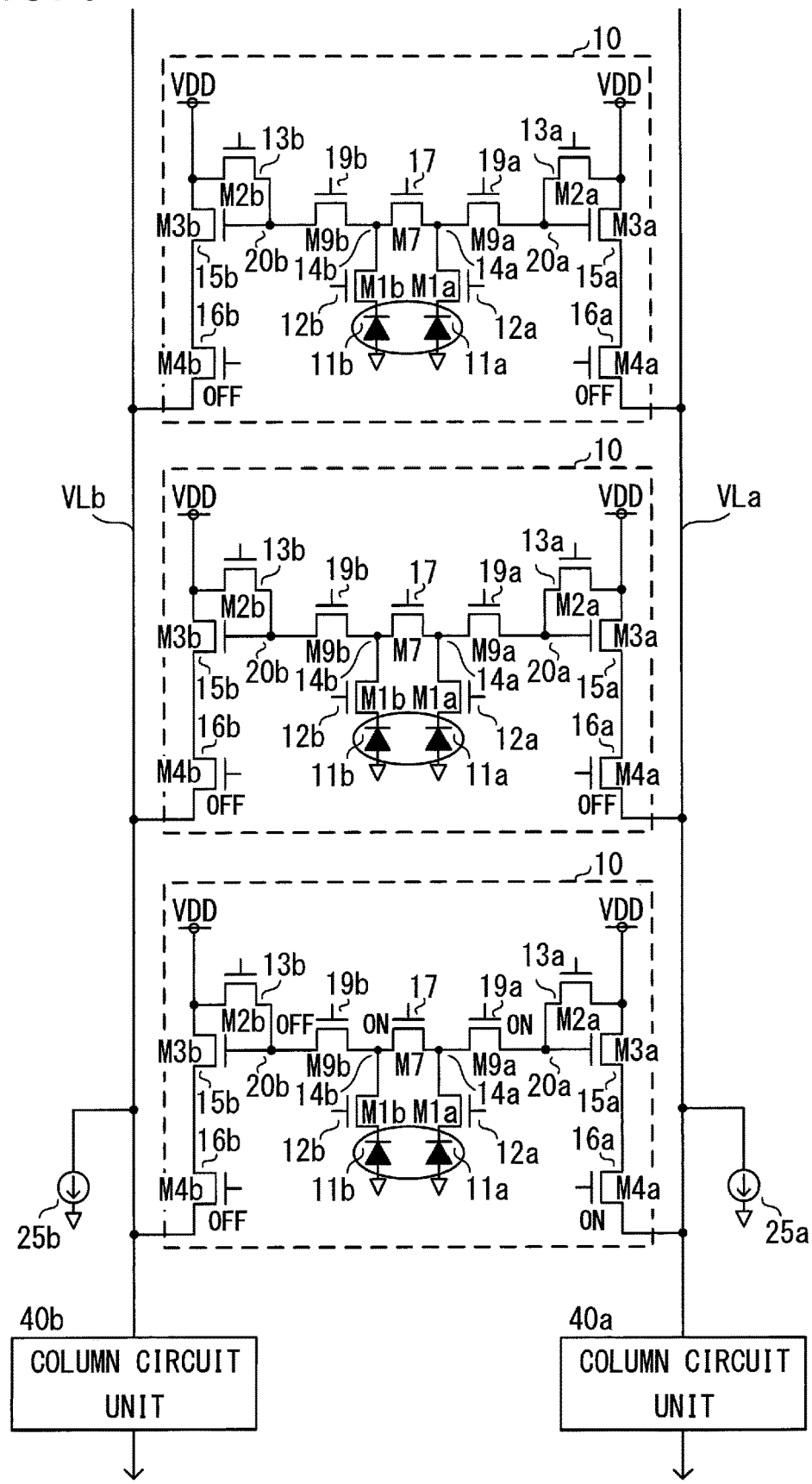
FIG. 3 is a view for explaining an example of an operation of the image sensor according to the first embodiment.

FIG. 3 shows one pixel column of the plurality of pixels 10 arranged two-dimensionally. In the image sensor 3, the first vertical signal line VLa and the second vertical signal line VLb are provided for a column of the plurality of the pixels 10 arranged in the column direction, that is, in the vertical direction. Additionally, a first current source 25a and a first column circuit unit 40a are provided for the first vertical signal line VLa, and a second current source 25b and a second column circuit unit 40b are provided for the second vertical signal line VLb. Note that in the example shown in FIG. 3, for simplification of description, only one pixel in the row direction by three pixels in the column direction in the pixels 10 is shown; however, the image sensor 3 has, for example, several millions to several hundreds of millions of pixels or more.

The first current source 25a is connected to each pixel 10 via the first vertical signal line VLa, and the second current source 25b is connected to each pixel 10 via the second vertical signal line VLb. The first current source 25a and the second current source 25b generate current for reading out a signal from each pixel 10. The first current source 25a supplies the generated current to the first vertical signal line VLa and the first selection unit 16a and the first amplification unit 15a of each pixel 10. Similarly, the second current source 25b supplies the generated current to the second vertical signal line VLb and the second selection unit 16b and the second amplification unit 15b of each pixel 10.

Each of the first column circuit unit 40a and the second column circuit unit 40b is configured to include an analog/digital conversion unit (AD conversion unit). The first column circuit unit 40a converts a signal input from each pixel 10 through the first vertical signal line VLa into a digital signal. The second column circuit unit 40b converts a signal input from each pixel 10 through the second vertical signal line VLb into a digital signal. The first column circuit unit 40a and the second column circuit unit 40b output the converted digital signal to a horizontal transfer unit described later.

In the one-row reading scheme of the second control mode, the image sensor 3 reads out a signal (addition pixel signal) according to a charge obtained by adding the charge of the first photoelectric conversion unit 11a and the charge of the second photoelectric conversion unit 11b, for example, to the first vertical signal line VLa. In the example shown in FIG. 3, an addition pixel signal is read out from the pixel 10 in the first row, that is, the pixel 10 in the lowermost row. In the pixel 10 in the first row, the transistor M7 of the addition switch unit 17 is on, the transistor M9a of the first connection switch unit 19a is on, and the transistor M9b of the second connection switch unit 19b is off. Further, in the pixel 10 in the first row, the transistor M4a of the first selection unit 16a is on, and the transistor M4b of the second selection unit 16b is off. On the other hand, in the pixel 10 in other rows such as second and third rows, the transistors M4a, M4b of the first and second selection units 16a, 16b are off. Note that in FIG. 3, ON indicates that a transistor is on (in a connected state, in a conductive state, in a short circuited state) and OFF indicates that a transistor is off (in a disconnected state, in a nonconductive state, in an open state, in a disconnected state).

In the pixel 10 in the first row, the transistor M7 of the addition switch unit 17 is turned on and the transistor M9a of the first connection switch unit 19a is turned on, so that the first and second accumulation units 14a, 14b and the first region 20a are electrically connected to each other. Additionally, the first transfer unit 12a and the second transfer unit 12b are electrically connected to each other. Since the transistor M9b of the second connection switch unit 19b is off, the second region 20b is electrically separated from the first accumulation unit 14a, the second accumulation unit 14b, and the first region 20a. This allows the charge transferred from the first photoelectric conversion unit 11a and the charge transferred from the second photoelectric conversion unit 11b to be added in the first accumulation unit 14a, the second accumulation unit 14b, and the first region 20a. It can also be said that the charge generated by the first photoelectric conversion unit 11a and the charge of the second photoelectric conversion unit 11b are mixed (combined).

Capacitances of the first accumulation unit 14a, the second accumulation unit 14b, and the first region 20a are electrically connected to one another, so that the charges transferred from the first photoelectric conversion unit 11a and the second photoelectric conversion unit 11b are distributed to the capacitances. A voltage of the first accumulation unit 14a, a voltage of the second accumulation unit 14b, and a voltage of the first region 20a are averaged, and the averaged voltage is input to the first amplification unit 15a. That is, the first amplification unit 15a receives a voltage that is a result of dividing a charge, which is a obtained by an addition of the accumulated charges of the first and second accumulation units 14a, 14b and the first region 20a, by a combined capacitance value of the capacitances of the first and second accumulation units 14a, 14b and the first region 20a.

In the pixel 10 in the first row, the transistor M4a of the first selection unit 16a is turned on, so that the first amplification unit 15a receives a current from the first current source 25a to operate in a saturation region. Since the transistor M3a of the first amplification unit 15a operates in the saturation region, a gate capacitance of the first amplification unit 15a has a generally constant capacitance value. Since the gate capacitance of the first amplification unit 15a has a generally constant value, the combined capacitance of the capacitance of the first accumulation unit 14a, the capacitance of the second accumulation unit 14b, and the capacitance of the first region 20a also keeps a predetermined value. The first amplification unit 15a generates an addition pixel signal based on a voltage that is a result of dividing a charge, which is obtained by an addition of the accumulated charges of the first and second accumulation units 14a, 14b and the first region 20a, by a combined capacitance value. The addition pixel signal is sent to the first vertical signal line VLa via the first selection unit 16a.

As described above, after the addition pixel signals is read out from the pixel 10 in the first row to the first vertical signal line VLa, pixels 10 in the second row, the third row, and so on are sequentially selected row by row in the image sensor 3, and addition pixel signals are read out from the pixels 10 to the first vertical signal line VLa. The addition pixel signal of the pixel 10 output to the first vertical signal line VLa is converted into a digital signal by the first column circuit unit 40a, and then output to the control unit 4 as an image-capturing signal.

In the example shown in FIG. 3, the addition pixel signals of the pixels 10 in each row are read out to the first vertical signal line VLa. The image sensor 3 can therefore stop the generation of current by the second current source 25b connected to the second vertical signal line VLb to which the addition pixel signal is not read out, so that a power consumption of the image sensor 3 can be reduced. Note that when the transistor M4a of the first selection unit 16a is off, the transistor M4b of the second selection unit 16b is on, the transistor M9a of the first connection switch unit 19a is off, and the transistor M9b of the second connection switch unit 19b is on, the addition pixel signals can be read out from the pixels 10 to the second vertical signal line VLb.

In the present embodiment, a conversion gain when the first and second accumulation units 14a, 14b and the first region 20a convert charges into voltage is the inverse of a combined capacitance value of the capacitance of the first accumulation unit 14a, the capacitance of the second accumulation unit 14b, and the capacitance of the first region 20a. The conversion gain can therefore be increased, compared with a case where the second region 20b is electrically connected to the first and second accumulation units 14a, 14b and the first region 20a. Consequently, a S/N ratio can be improved to obtain an addition pixel signal having a lower noise.

Further, in the present embodiment, a conversion gain when the charges are converted into voltage, i.e., the inverse of a combined capacitance value of the capacitance of the first accumulation unit 14a, the capacitance of the second accumulation unit 14b, and the capacitance of the first region 20a is always generally constant. The addition pixel signal therefore depends on the accumulated charges of the first and second accumulation units 14a, 14b and the first region 20a, and has a high linearity. The following description presents that the conversion gain of the first and second accumulation units 14a, 14b and the first region 20a is high and that the conversion gain is always generally constant, in comparison with a comparative example.

In the present embodiment, the transistor M9b of the second connection switch unit 19b is turned off, so that the second region 20b is electrically disconnected from the first and second accumulation units 14a, 14b and the first region 20a, as described above. Thus, a capacitance of a region to which the charge is transferred from the first and second photoelectric conversion units 11a, 11b is reduced. That is, the charges generated by the first and second photoelectric conversion units 11a, 11b are not accumulated on the capacitance of the second region 20b, but are accumulated on the capacitances of the first and second accumulation units 14a, 14b and the first regions 20a. Consequently, the conversion gain of the charge voltage can be increased.

Further, in the present embodiment, a gate capacitance of the transistor M3b of the second amplification unit 15b is electrically disconnected from the first and second accumulation units 14a, 14b and the first region 20a. The conversion gain when changing the transferred charge to voltage is, therefore, the inverse of the combined capacitance value of the capacitance of the first accumulation unit 14a, the capacitance of the second accumulation unit 14b, and the capacitance of the first region 20a. Thus, the conversion gain has a generally constant value without being affected by fluctuation of the gate capacitance of the transistor M3b.

On the other hand, in the comparative example, the first connection switch unit 19a and the second connection switch unit 19b are omitted from the pixel 10 of FIG. 3. In this case, the first accumulation unit 14a and the second accumulation unit 14b and the first region 20a and the second region 20b are electrically connected to one another. The first amplification unit 15a receives a voltage that is a result of dividing a charge, which is obtained by adding the accumulated charges of the first and second accumulation units 14a, 14b and the first and second regions 20a, 20b, by a combined capacitance value of the capacitances of the first and second accumulation units 14a, 14b and the first and the second regions 20a, 20b. The conversion gain of the first and second accumulation units 14a, 14b and the first and second regions 20a, 20b is the inverse of a combined capacitance value of the capacitance of the first accumulation unit 14a, the capacitance of the second accumulation unit 14b, the capacitance of the first region 20a, and the capacitance of the second region 20b. As a result, the conversion gain is reduced so that the S/N ratio is reduced.

Also, when the transistor M4a of the first selection unit 16a is turned on and the transistor M4b of the second selection unit 16b is turned off, a current is supplied to the first amplification unit 15a while no current is supplied to the second amplification unit 15b, so that the second amplification unit 15b operates in a weak inversion region. In the operation in the weak inversion region, the gate capacitance of the second amplification unit 15b changes in accordance with a signal input to the gate. In the comparative example, due to the fluctuation of the gate capacitance of the second amplification unit 15b, the combined capacitance added to the first amplification unit 15a also fluctuates. This leads to a fluctuation of the conversion gain of the charge voltage.

Figure 4:
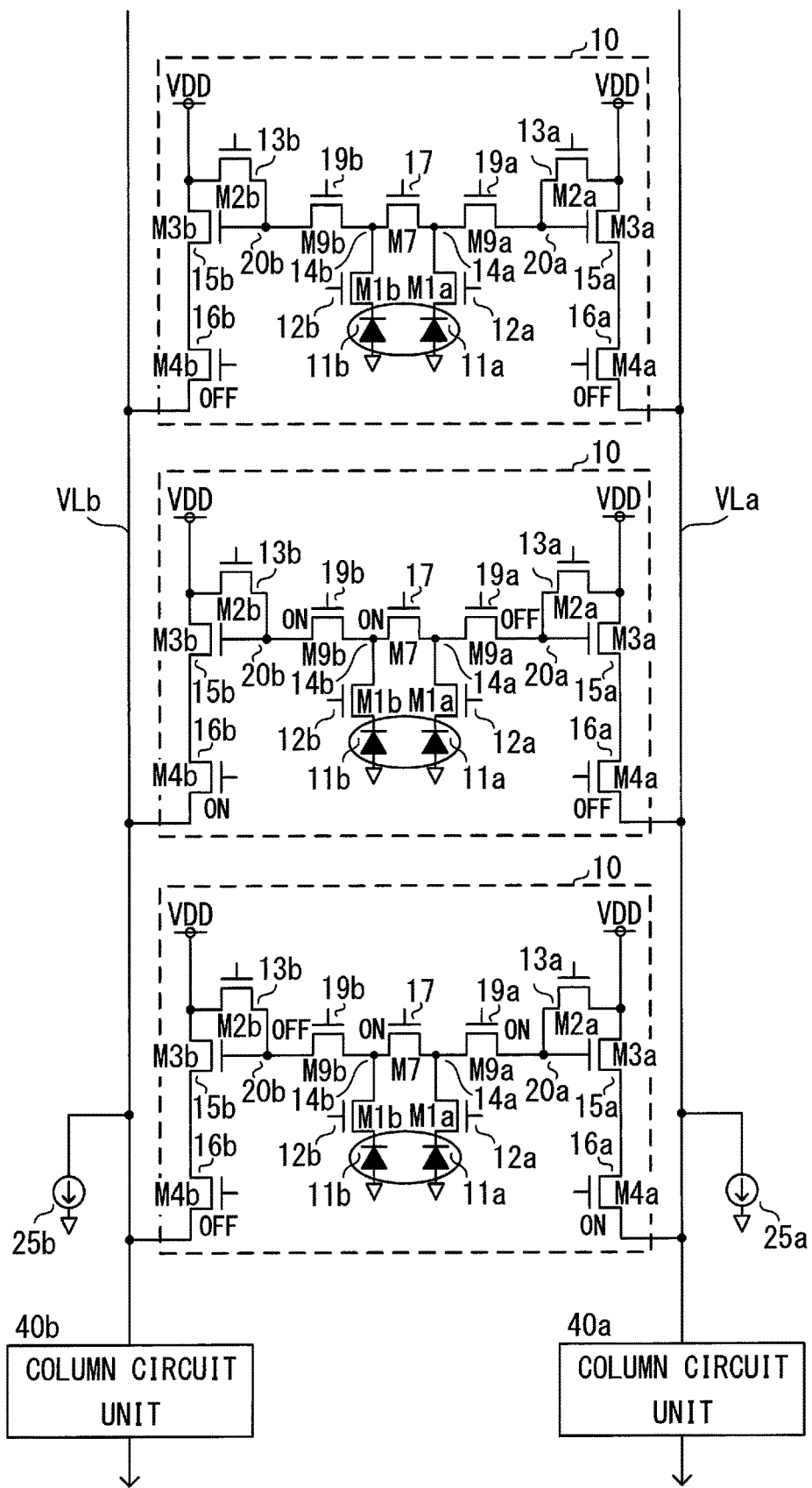
FIG. 4 is a view for explaining another example of an operation of the image sensor according to the first embodiment.

FIG. 4 is a diagram for explaining the two-row simultaneous reading scheme of the second control mode. The two-row simultaneous readout scheme of the second control mode involves, for pixels in two rows, reading out an addition pixel signal from one pixel in one row to the first vertical signal line VLa and, at the same time, reading out an addition pixel signal from another pixel in the other row to the second vertical signal line VLb. Details will be described below.

In the pixel 10 in the lowermost row, the transistor M7 of the addition switch unit 17 is on, the transistor M9a of the first connection switch unit 19a is on, and the transistor M9b of the second connection switch unit 19b is off. Further, in the pixel 10 in the first row, the transistor M4a of the first selection unit 16a is on, and the transistor M4b of the second selection unit 16b is off. In the pixel 10 in the second row, the transistor M7 of the addition switch unit 17 is on, the transistor M9a of the first connection switch unit 19a is off, and the transistor M9b of the second connection switch unit 19b is on. Further, in the pixel 10 in the second row, the transistor M4a of the first selection unit 16a is off, and the transistor M4b of the second selection unit 16b is on.

In each of the pixels 10 in the first and second rows, since the transistor M7 of the addition switch unit 17 is in the on state, the charge transferred from the first photoelectric conversion unit 11a and the charge transferred from the second photoelectric conversion unit 11b are added. Further, in each of the pixels 10 in the first row, when the transistor M9b of the second connection switch unit 19b is turned off, the second region 20b is electrically disconnected from the second accumulation unit 14b. On the other hand, in each of the pixels 10 in the second row, when the transistor M9a of the first connection switch unit 19a is turned off, the first region 20a is electrically disconnected from the first accumulation unit 14a. Thus, both in the first row and in the second row, the conversion gain of the charge voltage is increased and the conversion gain has a generally constant value.

An addition pixel signal based on the charges added from the pixels 10 in the first row is read out to the first vertical signal line VLa and, at the same time, an addition pixel signal based on the charges added from the pixels 10 in the second row is read out to the second vertical signal line VLb. After the simultaneous readout from the pixels in the first row and in the second row is completed, a simultaneous readout from pixels in a third row and in a fourth row is performed and further simultaneous readouts from pixels in an odd number row and an even number row which are adjacent to each other are performed sequentially.

In this way, in the two-row simultaneous readout scheme shown in FIG. 4, addition pixel signals of pixels in two rows can be simultaneously read out. A signal can thus be read out at a high speed from each pixel 10 arranged in the image sensor 3.

Figure 5:
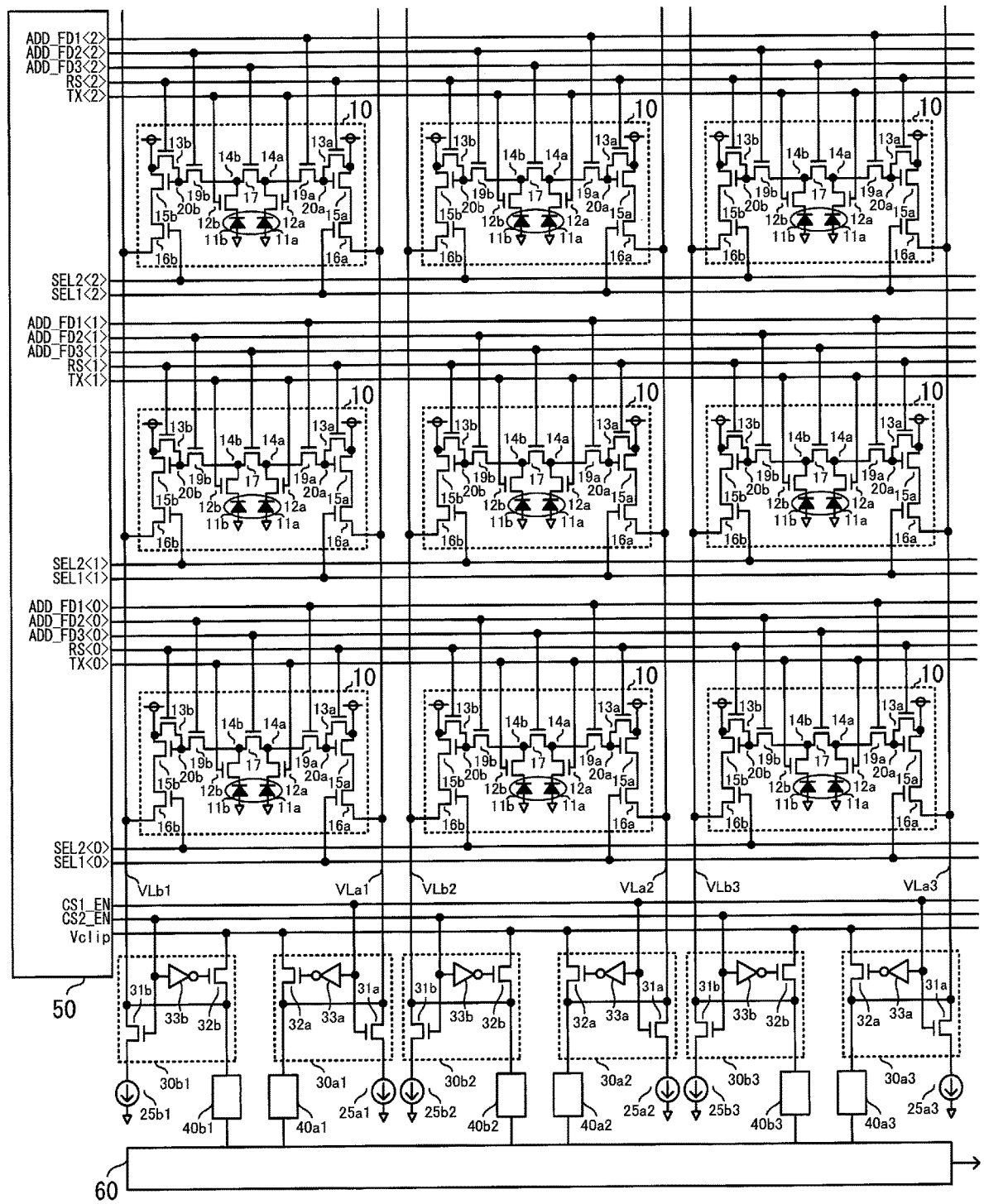
FIG. 5 is a circuit diagram showing a configuration of a part of the image sensor according to the first embodiment.
Figure 6:
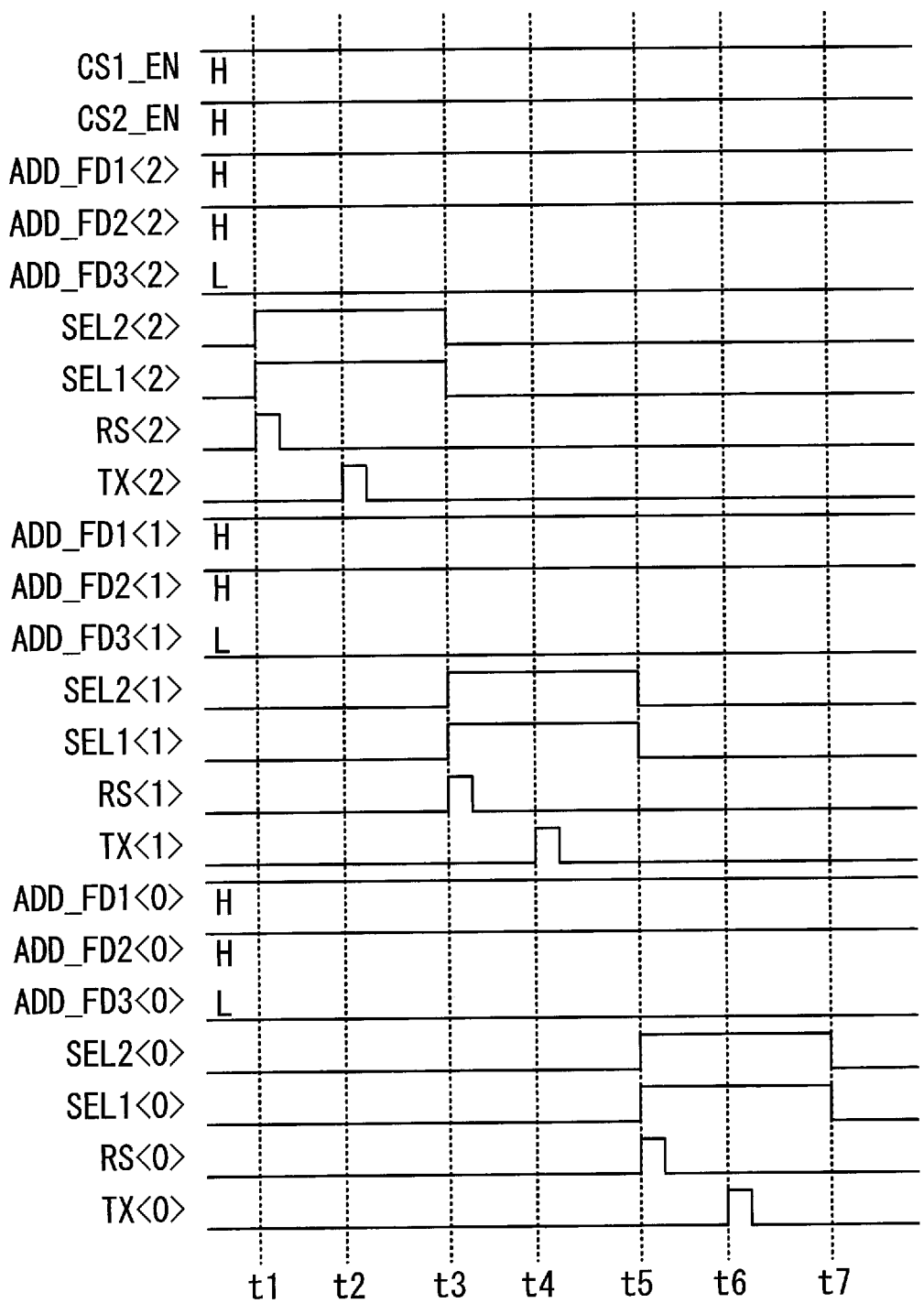
FIG. 6 is a timing chart showing an example of an operation of the image sensor according to the first embodiment.
Figure 7:
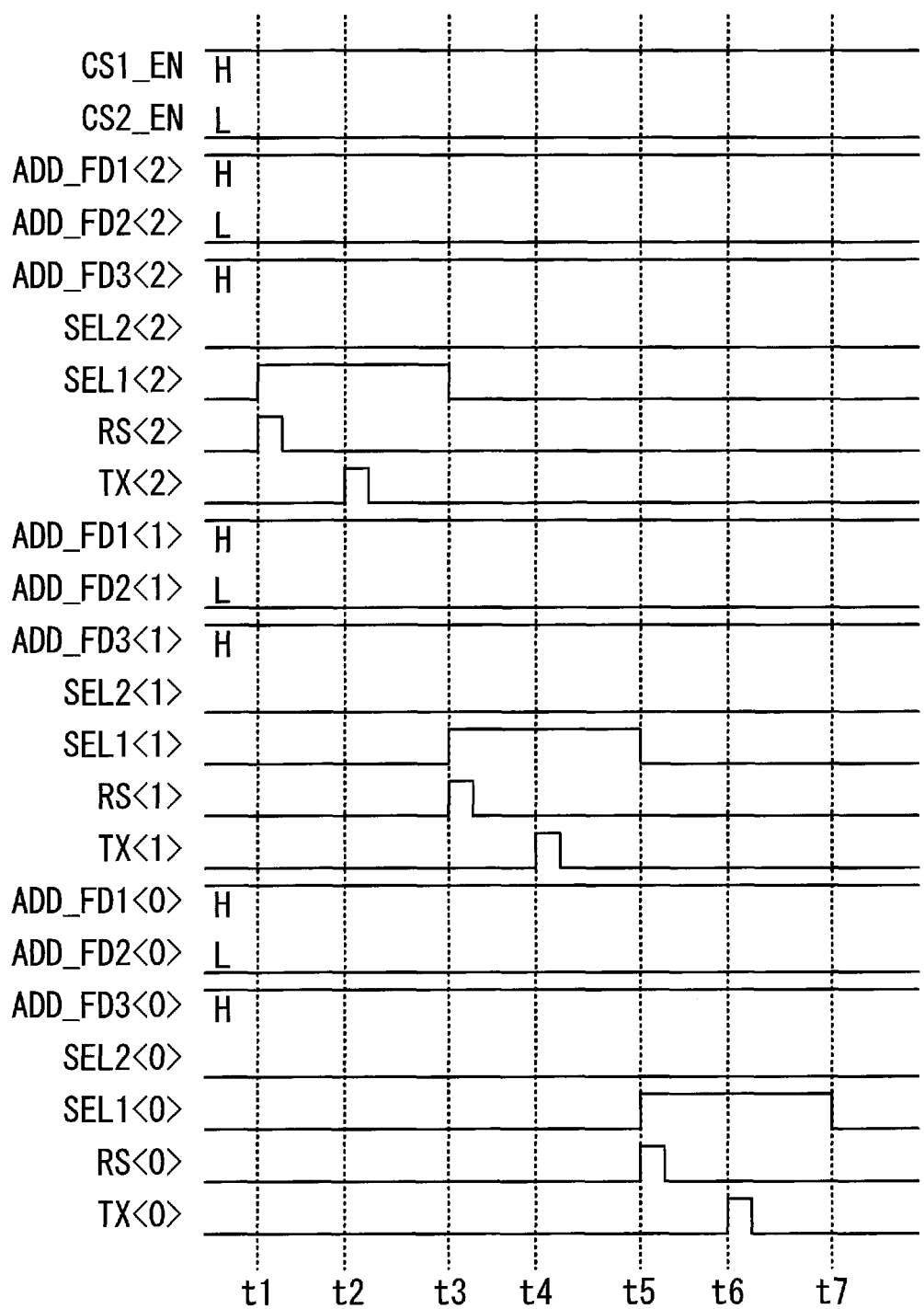
FIG. 7 is a timing chart showing another example of an operation of the image sensor according to the first embodiment.
Figure 8:
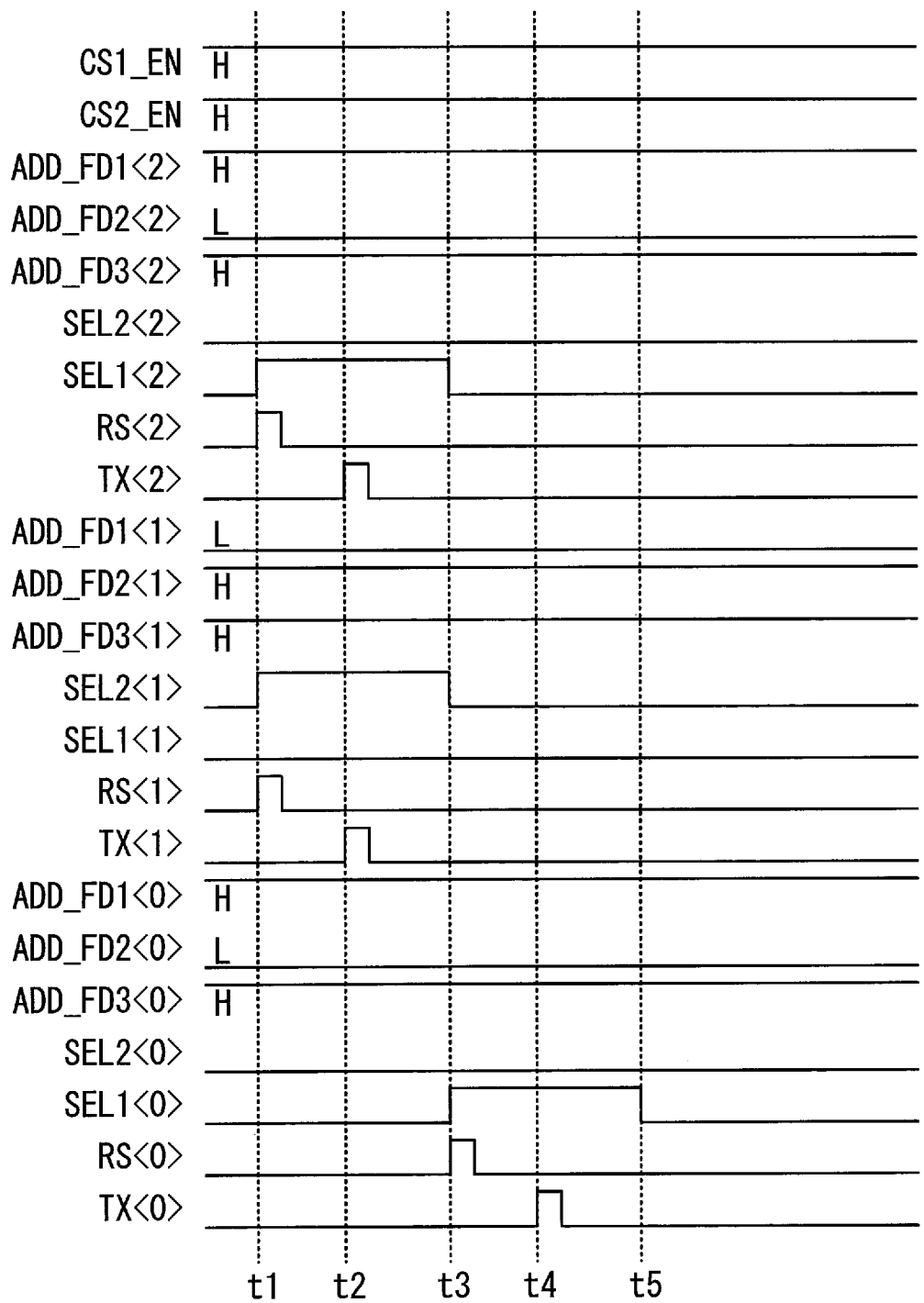
FIG. 8 is a timing chart showing another example of an operation of the image sensor according to the first embodiment.

A more detailed circuit configuration and operation of the image sensor 3 according to the first embodiment will be described with reference to FIGS. 5 to 8. FIG. 5 is a circuit diagram two-dimensionally showing the pixels 10 of the image sensor 3 according to the first embodiment and also showing a more detailed circuit configuration. FIG. 6 is a timing chart showing an example of an operation of the image sensor 3 in a case of the first control mode. FIG. 7 is a timing chart showing an example of an operation of the image sensor 3 in a case of the one-row reading scheme of the second control mode. FIG. 8 is a timing chart showing an example of an operation of the image sensor 3 in a case of the two-row simultaneous reading scheme of the second control mode.

As shown in FIG. 5, the image sensor 3 includes a plurality of pixels 10 arranged in a matrix, first current sources 25a (first current source 25a1 to first current source 25a3), and second current sources 25b (second current source 25b1 to second current source 25b3). The image sensor 3 further includes first current control units 30a (first current control unit 30a1 to first current control unit 30a3) and second current control units 30b (second current control unit 30b1 to second current control unit 30b3). The image sensor 3 further includes first column circuit units 40a (first column circuit unit 40a1 to first column circuit unit 40a3), second column circuit units 40b (second column circuit unit 40b1 to second column circuit unit 40b3), a vertical drive unit 50, and a horizontal transfer unit 60.

The first vertical signal lines VLa (first vertical signal line VLa1 to first vertical signal line VLa3) and the second vertical signal lines VLb (second vertical signal lines VLb1 to second vertical signal line VLb3) are provided so as to correspond to each column of the pixels 10. A first current source 25a, a first current control unit 30a, and a first column circuit unit 40a are provided for the first vertical signal line VLa. Further, a second current source 25b, a second current control unit 30b, and a second column circuit unit 40b are provided for the second vertical signal line VLb. Note that in the example shown in FIG. 5, for simplification of description, only one pixel in the row direction by three pixels in the column direction in the pixels 10 is shown.

The vertical drive unit 50 supplies a signal TX, a signal RS, a signal SEL1, a signal SEL2, a signal ADD_FD1, a signal ADD_FD2, and a signal ADD_FD3 to each pixel 10 to control the pixel 10. The first current control unit 30a includes switch units 31a, 32a and an inverter unit 33a. The second current control unit 30b includes switch units 31b, 32b and an inverter unit 33b. The vertical drive unit 50 supplies a signal CS1_EN, a signal CS2_EN, and a voltage Vclip to the first current control unit 30a and the second current control unit 30b. Note that in the example shown in FIG. 5, the first transfer unit 12a and the second transfer unit 12b are controlled by the same signal TX, and the first reset unit 13a and the second reset unit 13b are controlled by the same signal RS.

The horizontal transfer unit 60 sequentially transfers digital signals converted by the first column circuit unit 40a and the second column circuit unit 40b to a signal processing unit (not shown). The signal processing unit performs signal processing, such as correlated double sampling and a process of correcting the signal amount, on the signal input from the horizontal transfer unit 60, and outputs the processed signal to the control unit 4 of the camera 1.

In a timing chart shown in FIG. 6, the horizontal axis indicates time and also control signals input to units of the image sensor 3 in FIG. 5 in the case of the first control mode. Further, in FIG. 6, a transistor to which the control signal is input is turned on if the control signal is at high level (e.g., at a power supply potential), and the control signal is input is turned off if the control signal is at low level (e.g., at a ground potential).

The vertical drive unit 50 sets signals ADD_FD1<2> to ADD_FD1<0> to high level, signals ADD_FD2<2> to ADD_FD2<0> to high level, and signals ADD_FD3<2> to ADD_FD3<0> to low level, in order to set the first control mode. The signal ADD_FD1 is set to high level, so that the first accumulation unit 14a and the first amplification unit 15a of each pixel 10 are electrically connected to each other. The signal ADD_FD2 is set to high level, so that the second accumulation unit 14b and the second amplification unit 15b of each pixel 10 are electrically connected to each other. Additionally, the signal ADD_FD3 is set to low level, so that the first accumulation unit 14a and the first accumulation unit 14b of each pixel 10 are electrically disconnected from each other.

The vertical drive unit 50 sets the signal CS1_EN to high level and also sets the signal CS2_EN to high level. The signal CS1_EN is set to high level, so that the switch unit 31a of the first current control unit 30a is turned on. Thus, a current is supplied from the first current source 25a to the first vertical signal line VLa via the switch unit 31a. Additionally, the signal CS2_EN is set to high level, so that the switch unit 31b of the second current control unit 30b is turned on. Thereby, the current is supplied from the second current source 25b to the second vertical signal line VLb via the switch unit 31b.

At time t1 shown in FIG. 6, the signal RS<2> is set to high level, so that the transistors M2a, M2b of the first and second reset units 13a, 13b are turned on in each of the pixels 10 in the uppermost row. Potentials of the first accumulation unit 14a, the second accumulation unit 14b, the first region 20a, and the second region 20b become reset potentials.

Further, at time t1, the signal SEL1<2> is set to high level, so that a signal based on the reset potential is output to the first vertical signal line VLa by the first amplification unit 15a and the first selection unit 16a. That is, a signal (first noise signal) generated when the potentials of the first accumulation unit 14a and the first region 20a are reset to the reset potentials is read out to the first vertical signal line VLa. The first noise signal from each pixel 10 output to the first vertical signal line VLa is input to the first column circuit units 40a1 to 40a3 and converted to digital signals. Further, at time t1, the signal SEL2<2> is set to high level, so that a signal (second noise signal) generated when the potentials of the second accumulation unit 14b and the second region 20b are reset to the reset potentials is read out to the second vertical signal line VLb by the second amplification unit 15b and the second selection unit 16b. The second noise signal from each pixel 10 output to the second vertical signal line VLb is input to the second column circuit units 40b1 to 40b3 and converted to digital signals.

At time t2, the signal TX<2> is set to high level, so that the transistors M1a, M1b of the first and second transfer units 12a, 12b are turned on. Thus, the charge obtained through photoelectric conversion by the first photoelectric conversion unit 11a is transferred to the first accumulation unit 14a and the first region 20a. Further, the charge obtained through photoelectric conversion by the second photoelectric conversion unit 11b is transferred to the second accumulation unit 14b and the second region 20b.

Further, at time t2, since the signal SEL1<2> is set to high level, a first pixel signal is output to the first vertical signal line VLa by the first amplification unit 15a and the first selection unit 16a. The first pixel signal from each pixel 10 output to the first vertical signal line VLa is input to the first column circuit units 40a1 to 40a3 and converted to digital signals. Further, at time t2, since the signal SEL2<2> is set to high level, a second pixel signal is output to the second vertical signal line VLb by the second amplification unit 15b and the second selection unit 16b. The second pixel signal from each pixel 10 output to the second vertical signal line VLb is input to the second column circuit units 40b1 to 40b3 and converted to digital signals. The noise signal and the pixel signal, which are converted into the digital signals, are input to the signal processing unit via the horizontal transfer unit 60. The signal processing unit performs a correlated double sampling to perform subtraction processing between the noise signal and the addition pixel signal of the pixel 10.

From time t3 to time t5, readout of noise signals and readout of pixel signals from pixels in the middle row are performed in the same manner as in the period from time t1 to time t3. From time t5 to time t7, readout of noise signals and readout of pixel signals from pixels in the lowermost row are performed in the same manner as in the period from time t1 to time t3. In this way, in the first control mode shown in FIG. 6, a signal based on the charge generated by the first photoelectric conversion unit 11a is read out to the first vertical signal line VLa while a signal based on the charge generated by the second photoelectric conversion unit 11b is read out to the first vertical signal line VLb.

In a timing chart shown in FIG. 7, the horizontal axis indicates time and also control signals input to units of the image sensor 3 in FIG. 5 in the case of the one-row reading scheme of the second control mode. The vertical drive unit 50 sets signals ADD_FD1<2> to ADD_FD1<0> to high level, signals ADD_FD2<2> to ADD_FD2<0> to low level, and signals ADD_FD3<2> to ADD_FD3<0> to high level, in order to set the second control mode. The signal ADD_FD1 is set to high level, so that the first accumulation unit 14a and the first amplification unit 15a of each pixel 10 are electrically connected to each other. The signal ADD_FD2 is set to low level, so that the second accumulation unit 14b and the second amplification unit 15b of each pixel 10 are electrically disconnected from each other. Additionally, the signal ADD_FD3 is set to high level, so that the first accumulation unit 14a and the first accumulation unit 14b of each pixel 10 are electrically connected to each other.

The vertical drive unit 50 sets the signal CS1_EN to high level and also sets the signal CS2_EN to low level. The signal CS1_EN is set to high level, so that a current is supplied from the first current source 25a to the first vertical signal line VLa. Additionally, the signal CS2_EN is set to low level, so that the switch unit 31b of the second current control unit 30b is turned off and the switch unit 32b is turned on. Thereby, supply of the current from the second current source 25b to the second vertical signal line VLb is stopped, and a voltage Vclip is supplied via the switch unit 32b. The second vertical signal line VLb is fixed at a predetermined voltage to avoid a floating state.

At time t1 shown in FIG. 7, the signal RS<2> is set to high level, so that the transistors M2a, M2b of the first and second reset units 13a, 13b are turned on in each of the pixels 10 in the uppermost row. Potentials of the first accumulation unit 14a, the second accumulation unit 14b, the first region 20a, and the second region 20b become reset potentials. In this case, since the first accumulation unit 14a, the second accumulation unit 14b, and the first region 20a of the pixel 10 are connected to one another, potentials of the first and second accumulation units 14a, 14b and the first region 20a are averaged.

Further, at time t1, the signal SEL1<2> is set to high level, so that a signal based on the reset potential is output to the first vertical signal line VLa by the first amplification unit 15a and the first selection unit 16a. That is, a noise signal generated when the potentials of the first and second accumulation units 14a, 14b and the first region 20a are reset to the reset potentials is read out to the first vertical signal line VLa. The noise signal from each pixel 10 output to the first vertical signal line VLa is input to the first column circuit units 40a1 to 40a3 and converted to digital signals.

At time t2, the signal TX<2> is set to high level, so that the transistors M1a, M1b of the first and second transfer units 12a, 12b are turned on. As a result, the charge obtained through photoelectric conversion by the first and second photoelectric conversion units 11a, 11b is transferred to the first and second accumulation units 14a, 14b and the first region 20a.

Further, at time t2, since the signal SEL1<2> is set to high level, an addition pixel signal is output to the first vertical signal line VLa by the first amplification unit 15a and the first selection unit 16a. The addition pixel signal from each pixel 10 output to the first vertical signal line VLa is input to the first column circuit units 40a1 to 40a3 and converted to digital signals. The noise signal and the addition pixel signal, which are converted into the digital signals, are input to the signal processing unit via the horizontal transfer unit 60. The signal processing unit performs a correlated double sampling to perform subtraction processing between the noise signal and the addition pixel signal of the pixel 10.

From time t3 to time t5, readout of noise signals and readout of addition pixel signals from pixels in the middle row are performed in the same manner as in the period from time t1 to time t3. From time t5 to time t7, readout of noise signals and readout of addition pixel signals from pixels in the lowermost row are performed in the same manner as in the period from time t1 to time t3. In this way, in the one-row reading scheme shown in FIG. 7, the pixels 10 are sequentially selected row by row. Signals from the two photoelectric conversion units of the pixels 10 are then added to read out the addition pixel signal to the first vertical signal line VLa. Additionally, by stopping the supply of the current from the second current source 25b, the power consumption of the image sensor 3 can be reduced.

In a timing chart shown in FIG. 8, the horizontal axis indicates time and also control signals input to units of the image sensor 3 in FIG. 5 in the case of the two-row simultaneous reading scheme of the second control mode. The vertical drive unit 50 sets signals ADD_FD1<2> and ADD_FD1<0> to high level, and a signal ADD_FD1<1> to low level. Further, the vertical drive unit 50 sets signals ADD_FD2<2> and ADD_FD2<0> to low level, and a signal ADD_FD2<1> to high level. Furthermore, the vertical drive unit 50 sets signals ADD_FD3<2> to ADD_FD3<0> to high level. The signal ADD_FD3 is set to high level, so that the first accumulation unit 14a and the first accumulation unit 14b of each pixel 10 are electrically connected to each other.

In each of the pixels 10 in the uppermost row and the lowermost row, the signals ADD_FD1<2> and ADD_FD1<0> are set to high level, so that the first accumulation unit 14a and the first amplification unit 15a are electrically connected to each other. Additionally, the signals ADD_FD2<2> and ADD_FD2<0> are set to low level, so that the second accumulation unit 14b and the second amplification unit 15b are electrically disconnected from each other.

In each pixel 10 in the central row, the signal ADD_FD1<1> is set to low level, so that the first accumulation unit 14a and the first amplification unit 15a are electrically disconnected from each other. Additionally, the signal ADD_FD2<1> is set to high level, so that the second accumulation unit 14b and the second amplification unit 15b are electrically connected to each other.

The vertical drive unit 50 sets the signal CS1_EN to high level and also sets the signal CS2_EN to high level. Thus, a current is supplied from the first current source 25a to the first vertical signal line VLa, and a current is supplied from the second current source 25b to the second vertical signal line VLb.

At time t1 shown in FIG. 8, the signal RS<2> is set to high level, so that the transistors M2a, M2b of the first and second reset units 13a, 13b are turned on in each of the pixels 10 in the uppermost row. Potentials of the first accumulation unit 14a, the second accumulation unit 14b, the first region 20a, and the second region 20b become reset potentials. In this case, since the first accumulation unit 14a, the second accumulation unit 14b, and the first region 20a of the pixel 10 are connected to one another, potentials of the first and second accumulation units 14a, 14b and the first region 20a are averaged.

Further, at time t1, the signal SEL1<2> is set to high level, so that a signal based on the reset potential of the pixel 10 in the uppermost row is output to the first vertical signal line VLa by the first amplification unit 15a and the first selection unit 16a. That is, a noise signal generated when the potentials of the first and second accumulation units 14a, 14b and the first region 20a are reset to the reset potentials is read out to the first vertical signal line VLa. The noise signal from each pixel 10 in the uppermost row output to the first vertical signal line VLa is input to the first column circuit units 40a1 to 40a3 and converted to digital signals.

Further, at time t1, the signal RS<1> is set to high level, so that the transistors M2a, M2b of the first and second reset units 13a, 13b are turned on in each of the pixels 10 in the middle row. Potentials of the first accumulation unit 14a, the second accumulation unit 14b, the first region 20a, and the second region 20b become reset potentials. In this case, since the first accumulation unit 14a, the second accumulation unit 14b, and the second region 20b of the pixel 10 are connected to one another, potentials of the first and second accumulation units 14a, 14b and the second region 20b are averaged.

Further, at time t1, the signal SEL2<1> is set to high level, so that a signal based on the reset potential of the pixel 10 in the middle row is output to the second vertical signal line VLb by the second amplification unit 15b and the second selection unit 16b. That is, a noise signal generated when the potentials of the first and second accumulation units 14a, 14b and the second region 20b are reset to the reset potentials is read out to the second vertical signal line VLb. The noise signal from each pixel 10 in the middle row output to the second vertical signal line VLb is input to the second column circuit units 40b1 to 40b3 and converted to digital signals.

At time t2, the signal TX<2> is set to high level, so that the transistors M1a, M1b of the first and second transfer units 12a, 12b are turned on in the pixel 10 in the uppermost row. Thus, the charge obtained through photoelectric conversion by the first and second photoelectric conversion units 11a, 11b is transferred to the first and second accumulation units 14a, 14b and the first region 20a.

Further, at time t2, since the signal SEL1<2> is set to high level, an addition pixel signal of the pixel 10 in the uppermost row is output to the first vertical signal line VLa by the first amplification unit 15a and the first selection unit 16a. The addition pixel signal from each pixel 10 in the uppermost row output to the first vertical signal line VLa is input to the first column circuit units 40a1 to 40a3 and converted to digital signals.

At time t2, the signal TX<2> is set to high level, so that the transistors M1a, M1b of the first and second transfer units 12a, 12b are turned on in the pixel 10 in the middle row. Thus, the charge obtained through photoelectric conversion by the first and second photoelectric conversion units 11a, 11b is transferred to the first and second accumulation units 14a, 14b and the second region 20b.

Further, at time t2, when the signal SEL2<1> is set to high level, an addition pixel signal of the pixel 10 in the middle row is output to the second vertical signal line VLb by the second amplification unit 15b and the second selection unit 16b. The addition pixel signal from each pixel 10 in the middle row output to the second vertical signal line VLb is input to the second column circuit units 40b1 to 40b3 and converted to digital signals. The noise signal and the addition pixel signal, which are converted into the digital signals, are input to the signal processing unit via the horizontal transfer unit 60. The signal processing unit performs a correlated double sampling to perform subtraction processing between the noise signal and the addition pixel signal of the pixel 10.

In a period after time t3, simultaneous readouts from pixels in an odd number row and an even number row which are adjacent to each other are performed sequentially, as in the period from time t1 to time t3. In this way, in the two-row simultaneous readout scheme shown in FIG. 8, signals of pixels in two rows can be simultaneously read out. A signal can thus be read out at a high speed from each pixel 10 arranged in the image sensor 3.

The following description represents how to select and use the first control mode, the one-row reading scheme of the second control mode, and the two-row simultaneous reading scheme of the second control mode. In a case where the camera 1 performs the focus adjustment operation, the control unit 4 controls the image sensor 3 in the first control mode. Further, in a case where the camera 1 displays a through image (live view image) of a subject on the display unit 6, the control unit 4 controls the image sensor 3 in one-row reading scheme or two-row simultaneous reading scheme of the second control mode. Thus, in a case where the camera 1 displays a through image (live view image) of a subject on the display unit 6 while performing the focus adjustment operation, the control unit 4 controls the image sensor 3 in a time division manner in the first control mode and the second control mode with the one-row reading scheme or the two-row simultaneous reading scheme. In a case where a release operation member of the operation unit 7 is operated, the control unit 4 controls the image sensor 3 in the one-row reading scheme or the two-row simultaneous reading scheme of the second control mode.

Furthermore, in a case where the camera 1 performs photographing with a high frame rate, e.g., high-speed continuous photographing or moving image photographing, the control unit 4 controls the image sensor 3 in the two-row simultaneous reading scheme of the second control mode for a high-speed readout of addition pixel signals. Additionally, when the subject movement speed detection unit provided in the camera 1 detects that a subject is moving at a relatively high speed, the control unit 4 also controls the image sensor 3 in the two-row simultaneous reading scheme of the second control mode in order to read out addition pixel signals at a high speed to reduce blurring of the image. On the other hand, when a battery level detection unit detects that a remaining amount of a drive battery of the camera 1 is reduced, the control unit 4 controls the image sensor 3 in the one-row reading scheme of the second control mode in order to reduce a consumption of the battery.

According to the embodiment described above, the following advantageous effects can be achieved.

(1) The image sensor 3 includes a pixel 10 having: a first photoelectric conversion unit 11a that photoelectrically converts incident light to generate a first charge; a second photoelectric conversion unit 11b that photoelectrically converts incident light to generate a second charge; a first accumulation unit 14a that accumulates the first charge generated by the first photoelectric conversion unit 11a; a second accumulation unit 14b that accumulates the second charge generated by the second photoelectric conversion unit 11b; a first switch (addition switch unit 17) that connects and disconnects the first accumulation unit 14a to/from the second accumulation unit 14b; a first output unit (a first amplification unit 15a and a first selection unit 16a) that is connected to the first accumulation unit 14a; and a second output unit (a second amplification unit 15b and a second selection unit 16b) that is connected to and disconnected from the second accumulation unit 14b via a second connection unit (a second connection switch unit 19b). In the present embodiment, when the transistor M9b of the second connection switch unit 19b is turned off, the second region 20b is electrically disconnected from the first and second accumulation units 14a, 14b, the first region 20a, and the first amplification unit 15a. Thus, the conversion gain of the charge voltage can be increased. Consequently, a S/N ratio can be improved to obtain an addition pixel signal having a lower noise.

(2) In the present embodiment, when the transistor M9b of the second connection switch unit 19b is turned off, the first amplification unit 15a is electrically disconnected from the gate capacitance of the transistor M3b of the second amplification unit 15b. It is therefore possible to prevent the conversion gain from fluctuating under the influence of fluctuation of the gate capacitance of the transistor M3b. As a result, an addition pixel signal having a high linearity can be obtained.

The following modifications are also included within the scope of the present invention, and one or more of the modifications may be combined with the above-described embodiment.

First Modification

Figure 9:
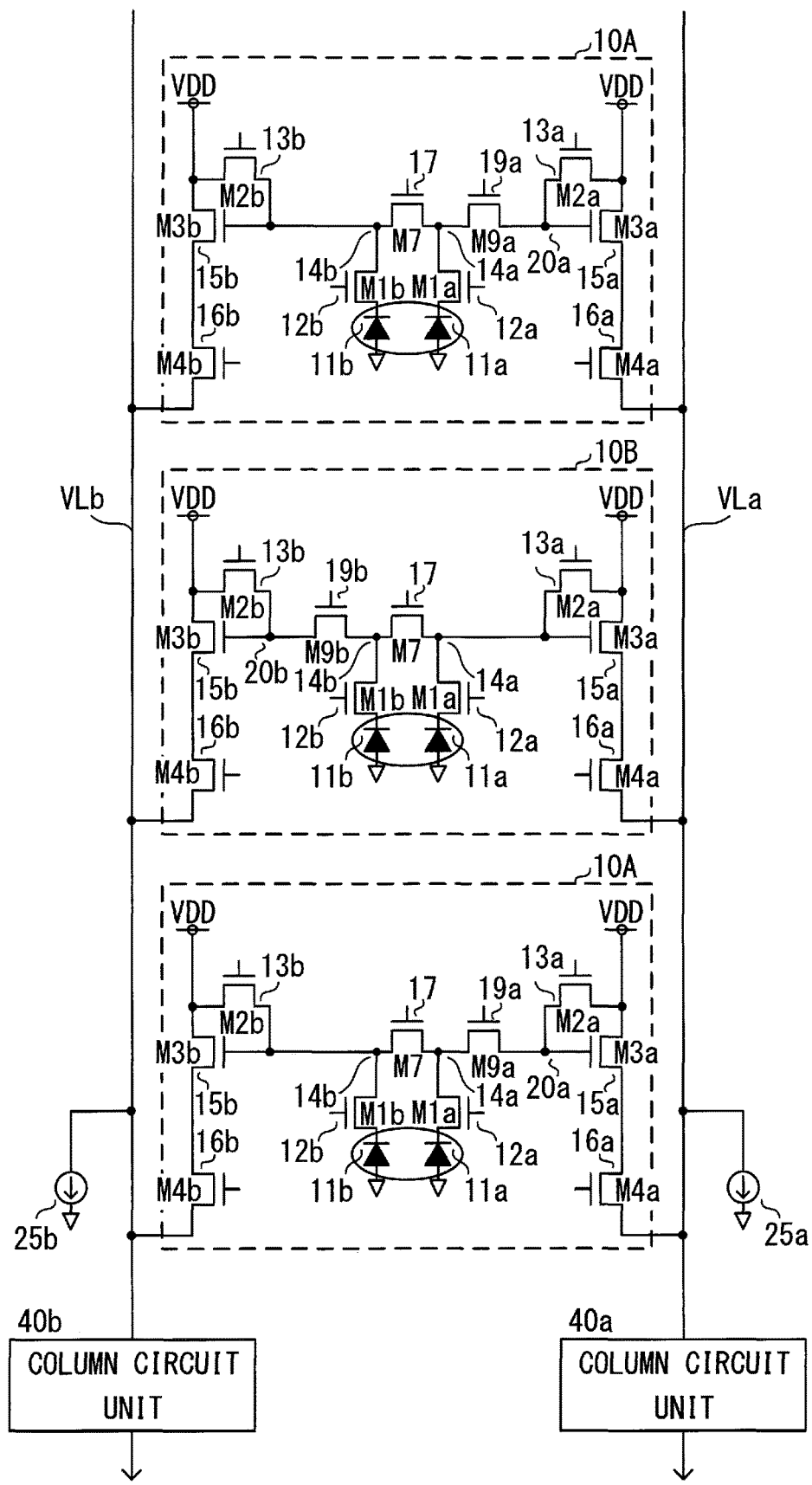
FIG. 9 is a view for explaining an example of an operation of the image sensor according to a first modification.

In the embodiment described above, an example has been described in which the first connection switch unit 19a and the second connection switch unit 19b are provided in the pixel 10. However, the pixel may be configured to have only one of the first connection switch unit 19a and the second connection switch unit 19b. As shown in FIG. 9, in the image sensor 3, a pixel 10A having a first connection switch unit 19a and a pixel 10B having a second connection switch unit 19b may be arranged.

The transistor M9a of the first connection switch unit 19a of the pixel 10A is turned off, so that the first region 20a is electrically disconnected from the first and second accumulation units 14a, 14b and the second region 20b. The conversion gain of the first and second accumulation units 14a, 14b and the second region 20b can therefore be increased. On the other hand, the transistor M9b of the second connection switch 19b of the pixel 10B is turned off, so that the second region 20b is electrically disconnected from the first and second accumulation units 14a, 14b and the first region 20a. The conversion gain of the first and second accumulation units 14a, 14b and the second region 20b can therefore be increased. In the example shown in FIG. 9, for example, for pixels in two rows, addition pixel signals are read out from a pixel 10A in one row to the second vertical signal line VLb and, at the same time, addition pixel signals are read out from a pixel 10B in the other row to the first vertical signal line VLa.

Second Modification

Figure 10:
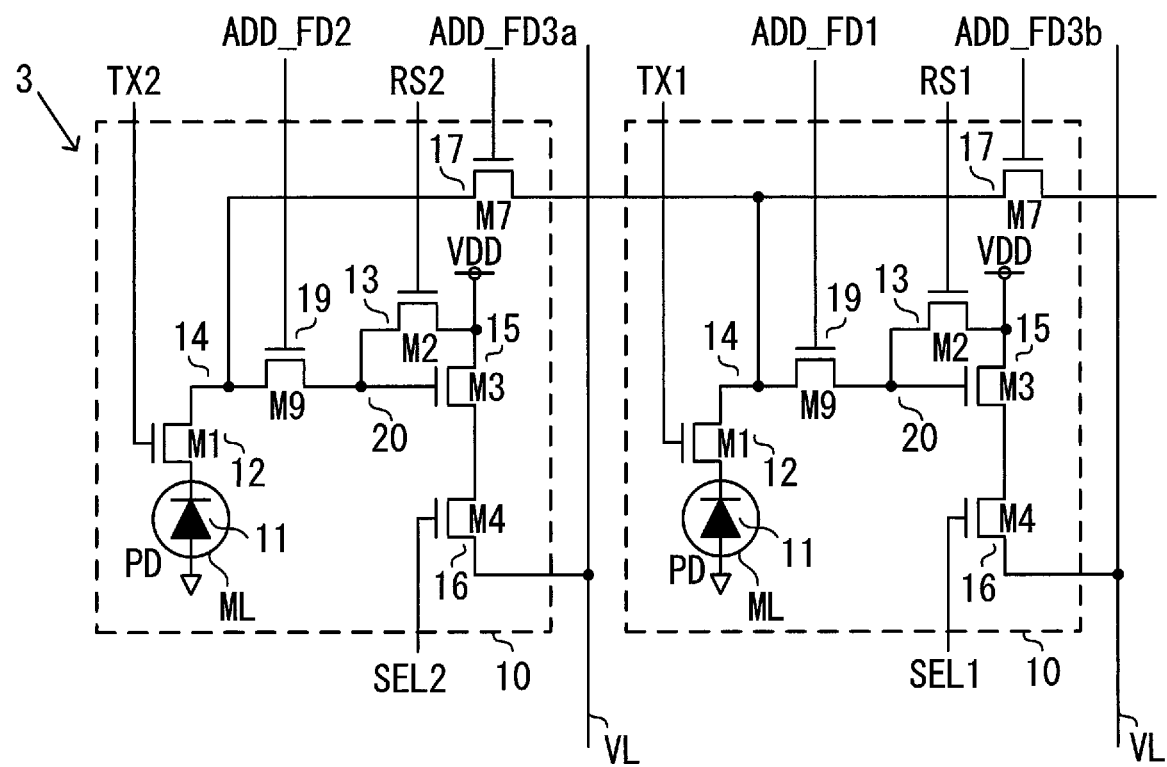
FIG. 10 is a circuit diagram showing a configuration of a pixel according to a second modification.

In the embodiment described above, an example has been described in which a plurality of photoelectric conversion units are arranged for each pixel 10. However, the pixel 10 may be configured to have one photoelectric conversion unit. In this case, for example, as shown in FIG. 10, the pixel 10 is provided with the addition switch unit 17 and the connection switch unit 19. The addition switch unit 17 connects the accumulation units 14 of the plurality of pixels 10 arranged in the row direction, for example. The connection switch unit 19 connects the accumulation unit 14 to the amplification unit 15. The control unit 4 can separate the accumulation unit 14 and the amplification unit 15 of the pixel 10 by performing an on/off control of the connection switch unit 19 so that the conversion gain of the charge voltage can be increased. Note that the connection switch unit 19 may not be arranged for each pixel 10. In the image sensor 3, pixels having the connection switch unit 19 and pixels not having the connection switch unit 19 may be arranged. For example, in the image sensor 3, pixels having the connection switch unit 19 and pixels not having the connection switch unit 19 may be alternately arranged. Further, the addition switch unit 17 may not be arranged for each pixel 10. Each addition switch unit 17 may be arranged for a plurality of pixels and shared by the plurality of pixels.

Third Modification

In the embodiment described above, an example has been described in which two photoelectric conversion units are arranged in one pixel; however, the configuration of the pixel is not limited thereto. The pixel may be configured to have three or more photoelectric conversion units for one pixel. In this case, for example, signals from the plurality of photoelectric conversion units may be individually read out in the first control mode, and signals from two or more photoelectric conversion units among the plurality of photoelectric conversion units may be added and read out in the second control mode.

Fourth Modification

In the embodiment and the modifications described above, an example has been described in which photodiodes are used as the photoelectric conversion units. However, a photoelectric conversion film may be used as the photoelectric conversion unit.

Fifth Modification

The image sensor 3 described in the embodiment and the modifications described above may be applied to a camera, a smartphone, a tablet, a camera built in a PC, an on-vehicle camera, a camera mounted on an unmanned aerial vehicle (drone, radio control machine, etc.).

Although various types of embodiments and modifications have been described above, the present invention is not limited to these. Other aspects contemplated within the scope of the technical idea of the present invention are also included within the scope of the present invention.

The disclosure of the following priority application is herein incorporated by reference:

Japanese Patent Application No. 2017-16286 (filed on Jan. 31, 2017)

REFERENCE SIGNS LIST

3 . . . image sensor, 4 . . . control unit, 10 . . . pixel, 11a . . . first photoelectric conversion unit, 11b . . . second photoelectric conversion unit, 17 . . . addition switch unit, 19a . . . first connection switch unit, 19b . . . second connection switch unit, 50 . . . vertical drive unit

The invention claimed is:

1. An image sensor, comprising:
a first pixel having a first photoelectric conversion unit that photoelectrically converts light to generate a charge, a first accumulation unit that accumulates the charge generated by the first photoelectric conversion unit, and a first output unit that is connected to the first accumulation unit;
a second pixel having a second photoelectric conversion unit that photoelectrically converts light to generate a charge, a second accumulation unit that accumulates the charge generated by the second photoelectric conversion unit, and a second output unit that is connected to the second accumulation unit; and
an adjustment unit that adjusts to reduce a total capacitance formed by the first accumulation unit and the second accumulation unit if a signal based on the charges generated by the first photoelectric conversion unit and the second photoelectric conversion unit is output from the first output unit.

2. The image sensor according to claim 1, wherein:
the adjustment unit adjusts so that (i) a capacitance of the first accumulation unit in one case in which a signal based on the charge generated by the first photoelectric conversion unit is output from the first output unit and (ii) the total capacitance of the first and second accumulation units in another case in which the signal based on the charges generated by the first photoelectric conversion unit and the second photoelectric conversion unit is output from the first output unit are the same.

3. The image sensor according to claim 1, wherein:
the second pixel has a second connection unit connected to the first accumulation unit;
the second output unit and the second accumulation unit are connected via the second connection unit; and
the adjustment unit adjusts to reduce the total capacitance formed by the first accumulation unit and the second accumulation unit by the second connection unit.

4. The image sensor according to claim 3, wherein:
if the signal based on the charges generated by the first photoelectric conversion unit and the second photoelectric conversion unit is output from the first output unit, the second connection unit disconnects the second output unit from the second accumulation unit.

5. An image sensor, comprising:
a first pixel having a first photoelectric conversion unit that photoelectrically converts light to generate a charge, a first accumulation unit that accumulates the charge generated by the first photoelectric conversion unit, a first connection unit that is connected to the first accumulation unit, and a first amplifier unit that is connected to the first accumulation unit via the first connection unit; and
a second pixel having a second photoelectric conversion unit that photoelectrically converts light to generate a charge, a second accumulation unit that accumulates the charge generated by the second photoelectric conversion unit, a second connection unit that includes at least one switch and is connected to the second accumulation unit, and a second amplifier unit that is connected to and disconnected from the second accumulation unit via the second connection unit.

6. The image sensor according to claim 5, comprising:
a first signal line that is connected to the first amplifier unit and to which a signal is output from the first amplifier unit; and
a second signal line that is connected to the second amplifier unit and to which a signal is output from the second amplifier unit.

7. The image sensor according to claim 6, wherein:
if a signal based on the charge generated by the first photoelectric conversion unit and a signal based on the charge generated by the second photoelectric conversion unit are output from the first amplifier unit to the first signal line, the second connection unit disconnects the second amplifier unit from the second accumulation unit.

8. The image sensor according to claim 6, wherein:
if a signal based on the charge accumulated by the first accumulation unit and a signal based on the charge accumulated by the second accumulation unit are output from the first amplifier unit to the first signal line, the second connection unit disconnects the second amplifier unit from the second accumulation unit.

9. The image sensor according to claim 6, wherein:
if a signal based on the charge generated by the first photoelectric conversion unit and a signal based on the charge generated by the second photoelectric conversion unit are output from the first amplifier unit to the first signal line, the first connection unit connects the first amplifier unit to the first accumulation unit.

10. The image sensor according to claim 6, wherein:
if a signal based on the charge accumulated by the first accumulation unit and a signal based on the charge accumulated by the second accumulation unit are output from the first amplifier unit to the first signal line, the first connection unit connects the first amplifier unit to the first accumulation unit.

11. The image sensor according to claim 6, comprising:
a third connection unit that connects the first accumulation unit to the second accumulation unit, wherein:
if the first accumulation unit and the second accumulation unit are connected by the third connection unit, a signal based on the charge accumulated in the first accumulation unit and a signal based on the charge accumulated in the second accumulation unit are output from the first amplifier unit to the first signal line.

12. The image sensor according to claim 11, wherein:
if the first accumulation unit and the second accumulation unit are disconnected by the third connection unit, the signal based on the charge accumulated in the first accumulation unit is output from the first amplifier unit to the first signal line, and the signal based on the charge accumulated in the second accumulation unit is output from the second amplifier unit to the second signal line.

13. The image sensor according to claim 7, wherein:
the first pixel includes a first transfer transistor that transfers the charge generated by the first photoelectric conversion unit to the first accumulation unit;
the second pixel includes a second transfer transistor that transfers the charge generated by the second photoelectric conversion unit to the second accumulation unit;
the first accumulation unit is a drain of the first transfer transistor;
the second accumulation unit is a drain of the second transfer transistor;
the first amplifier unit is a first amplification transistor that outputs the signal based on the charge generated by the first photoelectric conversion unit;
the second amplifier unit is a second amplification transistor that outputs the signal based on the charge generated by the second photoelectric conversion unit;
the first connection unit connects the first accumulation unit to the first amplification transistor;
the second connection unit connects the second accumulation unit to the second amplification transistor; and
if the signal based on the charge generated by the first photoelectric conversion unit and the signal based on the charge generated by the second photoelectric conversion unit are output from the first amplifier unit to the first signal line, the charge generated by the first photoelectric conversion unit and the charge generated by the second photoelectric conversion unit are accumulated in the first accumulation unit, the second accumulation unit, and a region connected to a gate of the first amplification transistor.

14. An image-capturing device, comprising:
the image sensor according to claim 1; and
an image data generation unit that generates image data based on a signal output from the image sensor.

15. An image-capturing device, comprising:
the image sensor according to claim 5; and
an image data generation unit that generates image data based on a signal output from the image sensor.

* * * * *